April 5, 1960

W. C. HOCH 2,931,267

MEANS FOR PRODUCING A PICTURE COMPRISING
A PLURALITY OF ADJACENT IMAGES

Filed Jan. 27, 1953

WINTON C. HOCH,
INVENTOR.

BY

ATTORNEY

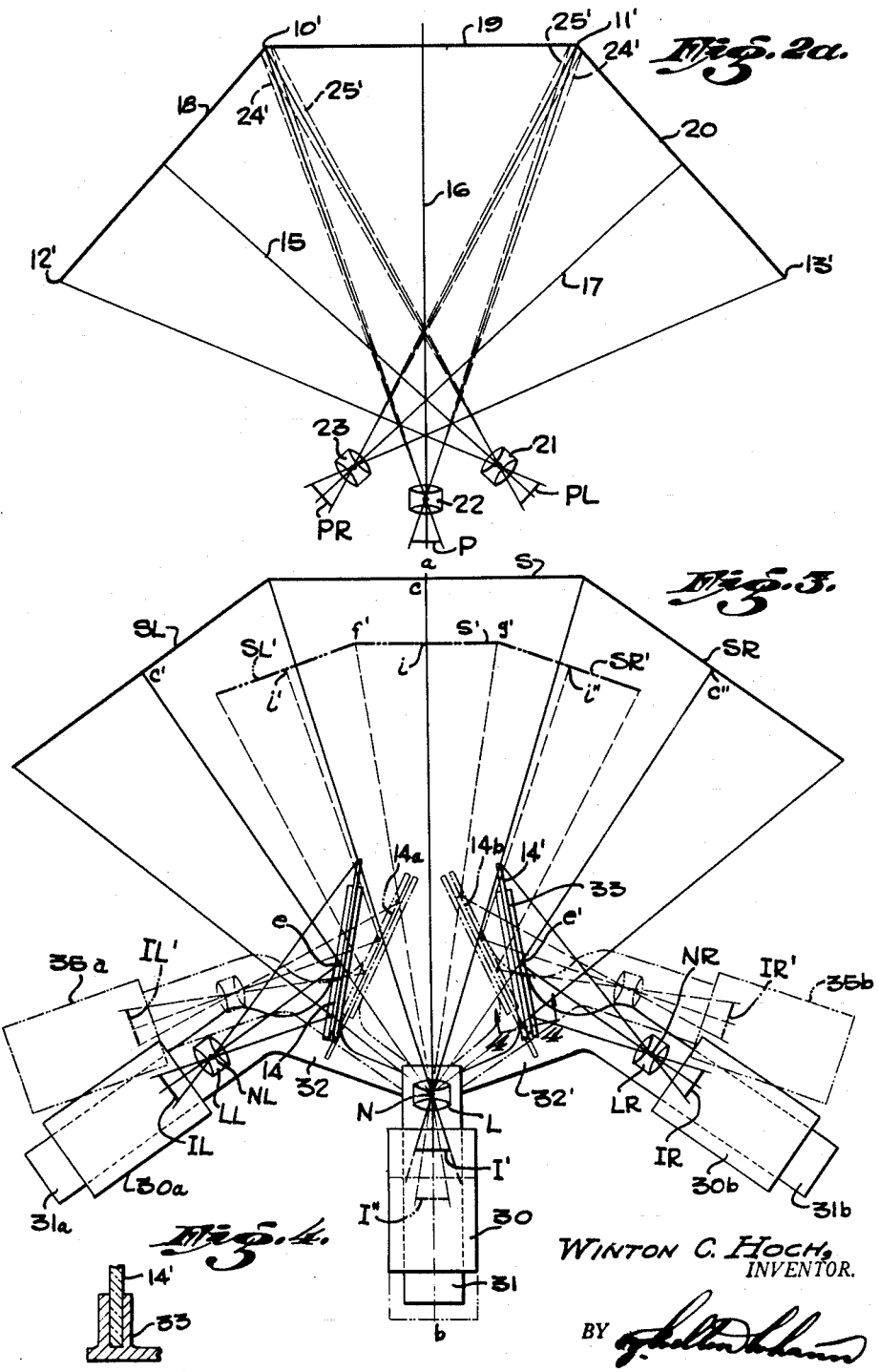

United States Patent Office 2,931,267
Patented Apr. 5, 1960

2,931,267

MEANS FOR PRODUCING A PICTURE COMPRISING A PLURALITY OF ADJACENT IMAGES

Winton C. Hoch, Los Angeles, Calif., assignor, by mesne assignments, to Cinerama, Inc., New York, N.Y., a corporation of New York Application January 27, 1953, Serial No. 333,436

3 Claims. (Cl. 88—16.6)

My invention relates in general to the production of still or motion pictures by the projection of picture images on screens, and relates in particular to a method and apparatus for producing on a screen or screens a large picture which includes, in side-by-side relation, images projected from a plurality of photographic positives and which avoids the serious faults arising from previously encountered parallax.

The conditions corrected by my present invention are principally those of image distortion which have been found in the areas of the component images along the blend lines where adjacent component images join. This image distortion may be disproportionate change of image size either in expansion or shrinkage, and under extreme conditions there may be complete disappearance of an object during its passage through a blend area from one component image to another.

It is an object of the invention to provide a method of producing a picture of the character set forth in the foregoing, which consists in part of photographing the separate scenes on separate negatives through lens means arranged so that the light value images emitted from the scenes travel along optical axes which in effect pass through the same nodal point. These optical axes coincide, through at least parts of their lengths, with the object axes which extend respectively from the centers of the objects through a point which may be designated as the apex or effective nodal point. The completion of the method consists of the preparation of photographic positives from the negatives obtained in the foregoing steps of the method and the projection of these positives in side-by-side relation on a screen, thereby producing a large positive picture which includes the separate images of the separate scenes.

A further object of the invention is to provide a method of producing photographic images of adjacent scenes on separate negatives through lens means, wherein the light value images pass outwardly from the scenes along optical axes which coincide for at least a part of their distances with object axes which extend respectively from the centers of the scenes through an apex point, and wherein at least one of the light value images is deflected to a side of the object axis along which it travels and is then passed through a lens to suitable image receiving means placed at one side of the apex point.

It is an object of the invention to provide a method of producing a picture wherein separate and side scenes are photographed on separate negatives through lens means arranged so that the light value images emitted from the scenes travel along optical axes which coincide through at least parts of their distances with object axes which extend respectively from the centers of the scenes through an apex point, wherein at least one of the light value images is deflected laterally to a side of the object axes along which it is travelling to a suitable image receiving means placed at one side of such object axes.

It is a further object of the apparatus to provide a multiplex camera for photographing adjacent scenes on separate negatives, this multiplex camera having lens means arranged so as to define pyramids extending forwardly from the respective scenes and having their apices meeting at an apex point, this multiplex camera having means for deflecting the light value image from at least one of the scenes laterally to an image receiving means.

It is a further object of the invention to provide a multiplex camera for photographing adjacent scenes on separate negatives, the multiplex camera having lens means arranged so as to define pyramids extending forwardly from the respective scenes and having their apices meeting at an apex point, further characterized by the pyramids having axes of equal length.

A further object of the invention is to provide a multiplex camera of the character set forth in the preceding paragraph wherein the lens means comprise separate matched objective lenses disposed so that the front nodal points thereof are disposed at equal object distances from their respective object scenes.

Further objects and advantages of the invention may be brought out in the following part of the specification wherein description of the invention has been presented in a detailed manner for the purpose of making a complete disclosure which may be easily utilized by those skilled in the art without limiting the scope of the appended claims or restricting the range of equivalents to which the claims may be entitled.

Referring to the drawings which are for illustrative purposes only:

Fig. 2a is a view similar to Fig. 2 showing a method of projecting positive images onto an angular disposed substantially vertical screen;

Fig. 3 is a schematic plan view showing a form of my multiplex camera having means of adjustment for focusing on scenes at different distances;

Fig. 4 is an enlarged fragmentary section to schematically show means for slidably supporting a mirror.

Figure 1:
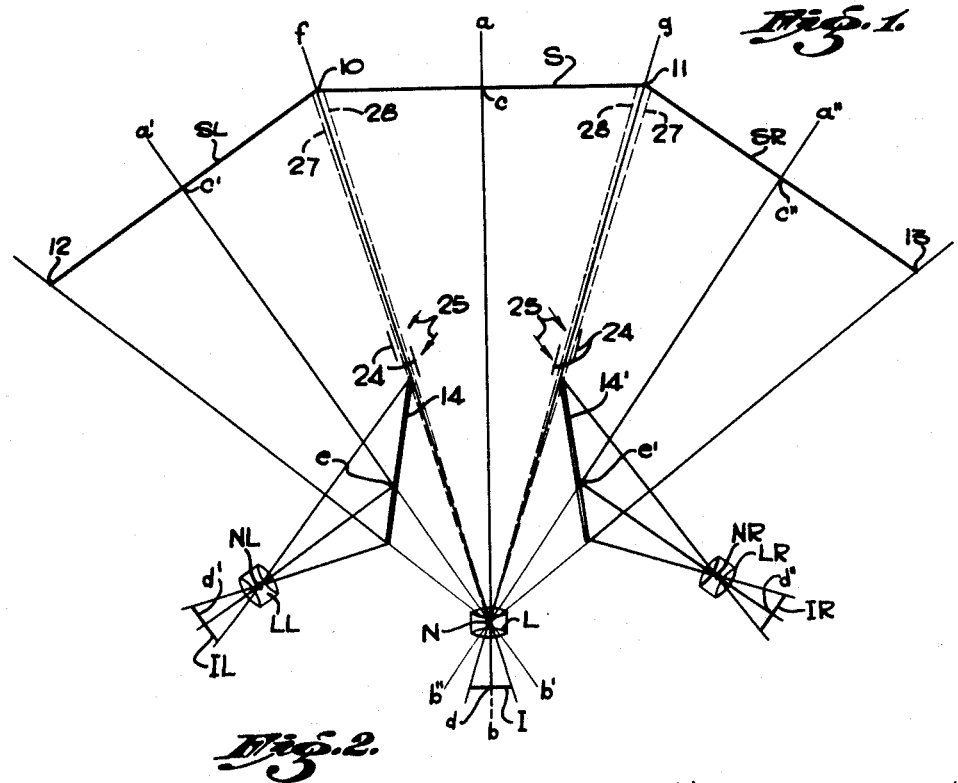
Fig. 1 is a schematic plan view to illustrate that part of my method comprising the photographing of adjacent scenes, and also schematically showing my new multiplex camera.

In explanation of my method, I show in Fig. 1 a central scene S extending from the point 10 to the point 11 so that the width of this scene is represented by the line which extends from 10 to 11. It will be understood that the scene S has a vertical height and lies in the object plane of a lens L which is focused on the scene S. Accordingly, the scene S and the object plane of the lens L coincide. For the purpose of explanation a line a—b is shown extending through the center point c of the scene or object S and the front nodal point N of the lens L. This line a—b is designated the object axis of the scene S. It extends through the center c of the scene S and is perpendicular to the object plane 10—11. The object axis a—b coincides with the optical axis of the lens L. The image I of the object S is shown disposed at a point d along the axis a—b. In the arrangement shown, the lens L is positioned so that it will have an object distance c-N and a conjugate focal distance N-d.

At the left of the scene S there is a scene SL extending from the point 10 to a point 12. This scene SL has approximately the same width as the scene S and has an object axis a'—b' which is perpendicular to its object plane and extends through its center c' and through the front nodal point N of the central lens L. A mirror 14 is arranged so that it will cross the axis a'—b' at a point e which is relatively close to the point N. The mirror 14 is arranged at an angle of, for example, 45° from the axis $e$ so that light passing along the axis $a'$—$b'$ from the center $c'$ toward the point N will be reflected at an angle of, for example, 90° through the front nodal point NL of a lens LL which is identical to the lens L. Accordingly, light from the object SL will be reflected by the mirror 14 and an image IL of the object SL will be formed by the lens LL at a distance NL-$d'$ from the nodal point NL. The object distance $c'$-$e$-NL has the same length as the object distance $c$N, and the focal distance NL-$d'$ is equal in length to the focal distance N$d$.

On the right side of the scene S there is a scene SR extending from the point 11 to a point 13 and having the same width as the scene S. This scene is arranged so that its object axis $a''$, and $b''$, which extends through its center $c''$ also passes through the front nodal point N of the central lens L. A mirror 14' is placed at an angle of 45° to the object axis $a''$—$b''$ so that an image of the point $c''$ will be reflected through the front nodal point NR of a lens LR to the center point $d''$ of the image IR which the lens LR forms of the scene of object SR. The lens LR is identical to the lens L and the object distance $c''$-$e''$-NR is equal to the object distance $c$-N, and is also equal to the object distance $c'$-$e$-NL of the lens LL. The lenses L, LL and LR may be vertically movable for the purpose of the so called lens drop adjustment well known to the photographic art.

My method further consists in substantially simultaneously photographing the adjacent, contacting scenes SL, S and SR by use of the optical arrangement shown in Fig. 1. The image IL, I and IR are received upon sensitized photographic surfaces which are subsequently developed so as to form complementary photographic negatives of the scenes SL, S and SR. The three negatives are then printed so as to produce three photographic positives PL, P and PR, Fig. 2, and the method is completed by projection of the images of positives PL, P and PR along axes 15, 16 and 17 onto screens 17, 18 and 19 of substantially equal width arranged in consecutive order, with the edges of consecutive screens engaging on vertical lines indicated by points 10' and 11'. These screens 18, 19 and 20 may consist of a continuous wall extending from the point 12' to the point 13'. The axes 15, 16 and 17 are perpendicular of and in centralized relation to the picture planes of the screens 18, 19 and 20 and the images PL, P and PR are projected through matched projection lenses 21, 22 and 23 arranged with their nodal points on the axes 15, 16 and 17, thereby producing on the screens 18, 19 and 20 a continuous image from the point 12', at the left, to the point 13' at the extreme right of the assembly of screens 18, 19 and 20. It will be understood that since the images IL and RL are "mirror images," it will be necessary to effect an image reversal prior to the appearance of the corresponding positive images on the screens 18 and 20.

Referring back to Fig. 1, I have shown means for avoiding ghost effects in the images IL and IR. This is accomplished by arranging vertical louvres 24 ahead of the forward ends of the front edges of the mirrors 14 and 14' to intercept light passing towards the lenses NL and NR from the scene S and/or SL and S and/or SR as indicated by arrows 25. Theoretically the lines $f$–N and $g$–N represent the converging vertical planes of divisions between the converging path of light from the scene S to the nodal part of the lens L, and the converging light paths which extend from the adjacent scenes SL and SR toward the mirrors $e$ and $e'$.

Figure 2:
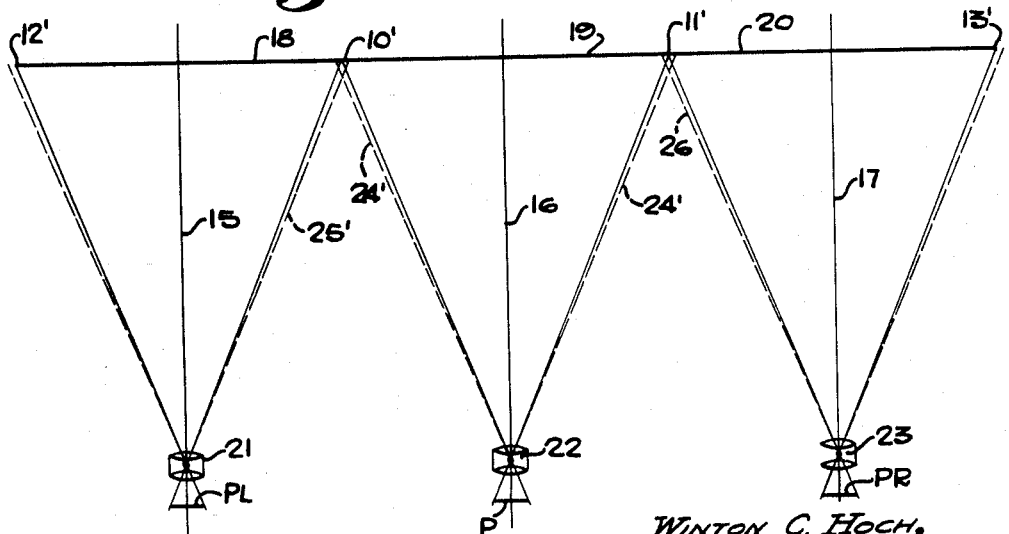
Fig. 2 is a schematic plan view showing that part of my method wherein the positive images obtained in the practice of the invention are projected on adjacent scene areas.

In the practical application of the method a small photographic overlap of the edges of the scenes S, SL and SR is provided in the photographing of such scenes. The points 10' and 11' of Fig. 2 represent the positions of the vertical blend lines between the images which are projected on the adjacent screens 18, 19 and 20. As indicated by the dotted lines 24', the image projected from the positive P is slightly wider than the screen 19 so that the margins of the image will lie outside the points 10' and 11'. Likewise, the images projected from the positives PL and PR, as indicated on the dotted lines 25' and 26' overlap the edges of the screen 19, the result being that there is an overlapping of the images along the vertical blend lines positioned at the points 10' and 11'. Ordinarily this overlap may be in the order of four percent. Provision for such overlap is made in the photographing of the scenes S, SL and SR, in arranging that the image I shall extend slightly beyond the edges of the image S, represented by the points 10 and 11, and embrace small portions of the edges of the images SL and SR, as indicated by dotted lines 27. Likewise the images IL and IR respectively include narrow edge portions of the central image S, as indicated by the dotted lines 28.

Fig. 2a includes all of the elements and conditions of Fig. 2, with the exception that the screens 18, 19 and 20 are disposed in angular relation conforming in general to the angular relation of the objects SL, S and SR of Fig. 1. The projection center lines 15, 16 and 17, which are substantially perpendicular to the screens 18, 19 and 20, cross at a point between the projectors and the screens, with the result that the positives PR and PL are transposed to opposite sides of the central axis 16.

In Fig. 3, I show the multiplex camera system of Fig. 1 arranged for adjustability to enable use thereof with different object distances. Therein I again show the lens L mounted on a base 31 so as to be laterally immovable, and at an object distance $c$N from the scene S. An image receiving part I' is supported by a schematically shown holder 30 which is in turn mounted on a guide portion of the base 31 so that it may be moved along the axis $ab$. The lens LL is positioned to the left of the mirror 14, at an object distance $c'$-$e$-NL from the scene or object SL. The lens LR is disposed to the right of the mirror 14', at an object distance $c''$-$e'$-NR from the scene SR. Swingable supports 32 and 32' are arranged so that they may be swung around the vertical axis which passes through the front nodal point N of the lens L. Each support 32 and 32' carries a mirror supporting and guiding means schematically shown at 33, permitting retraction and extension of the mirrors 14 and 14' as will be hereinafter explained. The lenses LL and LR are respectively fixed against lateral movement on the swingable supports 32 and 32' and therefore will be always at equal and fixed distances from the front nodal point N of the lens L and will also always be at fixed distances respectively from the points $e$ and $e'$. The image receiving means IL and IR are carried by supports 30$a$ and 30$b$ carried on guides 31$a$ and 31$b$ so as to be movable toward and away from the lenses LL and LR along the optical axes of such lenses for focusing purposes which will hereinafter be described.

In Fig. 3 I show an object S' closer to the lens L than the object S. In order to maintain conjugate object and image distances, the holder 30 which carries the image receiving means I' is moved rearwardly along the axis $a$—$b$ to bring the image receiving means I' into the conjugate position I''. Since the width of the image receiving member I' is fixed, the photographic field of the image S' is correspondingly narrowed so as to lie between the marginal lines $f'$ and $g'$. The lateral scenes SL' and SR' are correspondingly narrowed. Whereas the scene S is at an object distance $c$–N from the point N, the scene S' has an object distance $i$–N. The object axis $i$–N coincides with the axis $a$—$b$, but the object axes $i'$–N and $i''$–N of the scenes SL' and SR' are shifted with relation to the axes $a'$—$b'$ and $a''$ and $b''$ to new positions closer to the axis $a$—$b$. The invention provides for a corresponding shifting of optical parts, as follows. The supports 32 and 32' are rotated forwardly from the positions in which they are shown in full lines so that the points of intersection $e$ and $e'$ will be shifted from their positions on the axes $c'$–N and $c''$–N to the new positions on the axes $i'$–N and $i''$–N. Since this adjustment has not changed the distance of the point $e$ from the points N and NL, nor the distance of the point $e'$ from the points N and NR, the object distances from the nodal points of the lenses to the centers of the objects will be identical. However, the holders 30a and 30b carrying the image receiving means IL' and IR' will be moved along the guides 31a and 31b rearwardly to the positions 35a and 35b wherein the image receiving means IL' and IR' will be in proper conjugate focal relation to the respective scenes SL' and SR'. A further adjustment of parts consists in the sliding of the mirrors 14 and 14' rearwardly in the guides 33 to the retracted positions shown by dotted lines 14a and 14b, so that the front edges thereof will engage the marginal lines $f'$ and $g'$ which converge rearwardly from the extremities of the scene S'. In the photographic art the use of cams and levers for the automatic correlated adjustment of optical parts is well known. Accordingly, it is recognized that the adjustable parts of my invention may be provided with such cam and lever means for the correlated adjustment thereof.

It will be understood that the term negative referred to herein is only a form of image recording means or appropriate image receiving medium which may be used in the practice of the invention. It refers to any means, whether of still picture, motion picture or television character, employed in the camera to record the received images.

I claim:

1. In apparatus for photographing a central scene and contiguous side scenes for subsequent projection as a mosaic picture, which apparatus has a central lens in position to photograph the central scene, side lens matched with central lens and including one on each side of the central lens for photographing the contiguous side scenes, a reflector in front of each side lens and located at such an angle to the side lens and its scene that the optical axis of each side lens after reflection is substantially in line with the nodal point of the central lens, each side lens being spaced from its reflector by the same distance that the reflector is spaced from the nodal point of the central lens, and a different holder behind each lens for image-recording means, the improvement which comprises supporting means for the center lens and the holder behind the center lens and by which the center lens is held at a fixed location and on which the holder is movable toward and from the center lens for change of focus, an angularly movable common support for each of the side lenses and for the respective holder of the image-recording means behind the corresponding lens, each of said common supports being angularly movable about a center at the nodal point of the center lens whereby the optical axis of each side lens is adapted to be shifted to compensate the change in the field area of the central lens with change in focus of the image-recording means behind the center lens, and means adjustably mounting said reflectors each on one of said common supports whereby each of the reflectors has movement in unison with its associated lens and the holder for the image-recording means behind that lens, the lens on each of the common supports being at a fixed location on the support and therefore always at the same distance from the nodal point of the center lens, and the holder on each of the common supports being movable on the support toward and from its associated lens for change of focus.

2. The apparatus described in claim 1 and in which there are baffle means for reducing passage of ghost-forming light from any of said scenes to said side lenses, the baffle means including thin and flat elements located ahead of the reflectors near the ends of the reflectors that are closest to the scenes, said elements being disposed with their planes in substantial alignment with the direction of the incident light for the lens prior to reflection of that light and at a location near the region where the light pyramid of the side lens is adjacent to that of the central lens.

3. The apparatus for photographing described in claim 1 and in which there is a guide on each of said common supports and said guide moves as a unit with the common support and the reflector for each side lens is plane and is carried by the guide and is movable in the guide in the direction of the extent of the plane of said reflector.

References Cited in the file of this patent

UNITED STATES PATENTS

| 1,489,988 | Dickinson | Apr. 8, 1924 |
| 2,337,363 | Ames | Dec. 21, 1943 |
| 2,544,116 | Waller et al. | Mar. 6, 1951 |
| 2,583,030 | Waller et al. | Jan. 22, 1952 |
| 2,622,495 | Jensen | Dec. 23, 1952 |

FOREIGN PATENTS

| 385,423 | France | May 12, 1908 |
| 170,478 | Great Britain | Oct. 27, 1921 |